United States Patent [19]

Miyamoto

[11] Patent Number: 5,379,286
[45] Date of Patent: Jan. 3, 1995

[54] OPTICAL INFORMATION RECORDING-REPRODUCING APPARATUS HAVING A PRISM

[75] Inventor: Moritoshi Miyamoto, Kawasaki, Japan

[73] Assignee: Canon Kabushiki Kaisha, Tokyo, Japan

[21] Appl. No.: 232,580

[22] Filed: Apr. 25, 1994

Related U.S. Application Data

[63] Continuation of Ser. No. 113,524, Aug. 30, 1993, abandoned, which is a continuation of Ser. No. 729443, Jul. 12, 1991, abandoned.

[30] Foreign Application Priority Data

| Jul. 24, 1990 | [JP] | Japan | 2-194026 |
| Jul. 24, 1990 | [JP] | Japan | 2-194027 |
| Sep. 7, 1990  | [JP] | Japan | 2-235897 |

[51] Int. Cl.⁶ .............................. G11B 7/12
[52] U.S. Cl. .................................. 369/112
[58] Field of Search ............... 369/44.12, 44.23, 44.37, 369/44.38, 112; 250/201.5

[56] References Cited

U.S. PATENT DOCUMENTS

| 4,775,968 | 10/1988 | Ohsato ............... | 369/44.37 |
| 4,888,759 | 12/1989 | Hazel et al. ......... | 369/112 |
| 4,918,679 | 4/1990  | Opheij et al. ....... | 369/44.37 |

FOREIGN PATENT DOCUMENTS

| 61-267937 | 5/1985 | Japan. |
| 61-292235 | 6/1985 | Japan. |
| 62-208002 | 3/1986 | Japan. |

OTHER PUBLICATIONS 62-273633, May 21, 1986 English Abstract of Japanese Application.

*Primary Examiner*—Donald E. McElheny, Jr.
*Attorney, Agent, or Firm*—Fitzpatrick, Cella, Harper & Scinto

[57] ABSTRACT

An optical information recording-reproducing apparatus comprising a light source, which produces a recording light beam. The apparatus further comprises, a light source producing a reproducing light beam differing in wavelength from the recording light beam, a detecting optical system for detecting a light beam passed through a recording medium, and a beam shaping prism for shaping the light beams of the two light sources into predetermined intensity distributions, the beam shaping prism being constructed of a division prism comprising at least three prisms cemented together, a polarization dividing surface for transmitting the light beams from the light sources therethrough and reflecting the reflected light from the recording medium being formed on at least one of the dividing surfaces of the division prism, and a wavelength dividing surface for directing the reproducing light beam of the reflected light from the recording medium being formed on at least one other dividing surface.

20 Claims, 13 Drawing Sheets

OPTICAL INFORMATION RECORDING-REPRODUCING APPARATUS HAVING A PRISM

This application is a continuation of application Ser. No. 08/113,524 filed Aug. 30, 1993, which is a continuation of application Ser. No. 07/729,443 filed Jul. 12, 1991, both now abandoned.

BACKGROUND AND SUMMARY OF THE INVENTION

This invention relates to an optical information recording-reproducing apparatus of the two-light-source type which is provided with a light source for recording and a light source for reproduction separately.

Various information mediums such as a disk-like medium, a card-like medium and a tape-like medium are known as optical information mediums for effecting the recording and/or reproduction of information thereon by the use of light. These optical information recording mediums include mediums capable of recording and reproduction, and mediums capable of reproduction only. To record information on a medium capable of recording, information tracks are scanned by a light beam modulated in accordance with recording information and stopped down into a minute spot, and the information is recorded as an optically detectable information pit row.

Also, to reproduce information from a recording medium, an information pit row on an information track is scanned by a light beam spot of such a degree of predetermined power that recording is not effected on the medium, and light reflected from or transmitted through the medium is detected.

An optical head used to record and/or reproduce information on thee recording medium is made movable relative to the recording medium in the direction of the information tracks thereof and a direction transverse to said direction, and by this movement, the information track scanning of the light beam spot is effected. As a lens for stopping down the light beam spot in the optical head, use is made, for example, of an objective lens. This objective lens is held so as to be movable independently with respect to the optical head body in the direction of the optical axis thereof (the focusing direction) and a direction orthogonal to both of the direction of the optical axis and the direction of the information tracks of the recording medium (the tracking direction). The holding of such an objective lens is accomplished generally through an elastic member, and the movements of the objective lens in said two directions are generally driven by an actuator which utilizes a magnetic interaction.

Now, among the above-mentioned optical information recording mediums, the card-like optical information recording medium (hereinafter referred to as the optical card) has a great expected demand as an information recording medium of relatively large capacity which is compact and light in weight as well as convenient to carry.

FIG. 1 of the accompanying drawings shows a schematic plan view of a postscript type optical card, and FIG. 2 of the accompanying drawings shows a fragmentary enlarged view thereof.

In FIG. 1, a number of information tracks 2 are arranged on the information recording surface of the optical card 1 in parallelism to one another in the direction of arrows L and F. Also, a home position 3, which provides the reference position of the access to the information tracks 2, is provided on the information recording surface of the optical card 1. The information tracks 2 are arranged as indicated by 2-1, 2-2, 2-3, ... in order from the home position 3, and as shown in FIG. 2, tracking tracks are successively provided adjacent to these respective information tracks as indicated by 4-1, 4-2, 4-3, .... These tracking tracks 4 are used as a guide for auto tracking (hereinafter referred to as AT) which controls a light beam spot so as not to deviate from a predetermined information track when the light beam spot scans during the recording or reproduction of information.

This AT servo is accomplished by detecting the deviation (AT error) of the light beam spot from the information track in the optical head, negatively feeding back the detection signal to the tracking actuator, moving the objective lens relative to the optical head body in the tracking direction (the direction of arrow D, and causing the light beam spot to follow a desired information track.

When the information tracks are scanned by a light beam spot during the recording or reproduction of information, auto focusing (hereinafter referred to as AF) servo is effected to make the light beam into a spot of suitable size (focus) on the surface of the optical card. This AF servo is accomplished by detecting the deviation (AF error) of the light beam spot from its in-focus state in the optical head, negatively feeding back the detection signal to the focusing actuator, moving the objective lens relative to the optical head body in the focusing direction and focusing the light beam spot on the surface of the optical card.

In FIG. 2, S1, S2 and 3 designate light beam spots, and the light spots S1 and S3 are used to effect tracking. The light spot S2 is used to effect focusing, the preparation of information pits during recording, and the reading-out of the information pits during reproduction. Also, in the respective information tracks, 6-1, 6-2 and 7-1, 7-2 denote left address portions and right address portions, respectively, subjected to preformat, and by reading out these address portions, the identification of the tracks is accomplished. The reference numeral 5 (in FIG. 2, 5-1 and 5-2 correspond thereto) designates data portions in which predetermined information is recorded.

Here, the optical information recording system will be described briefly. The optical information recording system broadly includes two types. One type is the single light source type in which recording and reproduction are effected by the use of one and the same light source, and the other type is the two-light-source type in which recording and reproduction are effected by the use of two different light sources. The two-light-source type, as compared with the single light source type, is said to be advantageous in terms of the deterioration of reproducing light, high speed, etc.

FIG. 3 of the accompanying drawings shows a schematic view of an optical head optical system of the two-light-source type. The two-light-source type adopts discrete light sources for recording and reproduction, thereby making the prevention of the deterioration of reproducing light and high-speed recording possible.

In FIG. 3, the reference numerals 21 and 22 designate semiconductor lasers which are light sources. The semiconductor laser 21 emits lights of wavelength 780 nm, and the semiconductor laser 22 emits light of wavelength 830 nm. The reference numerals 23 and 24 denote collimator lenses, the reference numeral 25 designates a diffraction grating for dividing a light beam, the reference numeral 26 denotes a dichroic prism designed to transmit light of 780 nm of P-polarized component therethrough and reflect light of 830 nm, the reference numeral 27 designates a beam shaping prism, and the reference numeral 28 denotes a polarizing beam splitter. The reference numeral 29 designates a quarter wavelength plate, the reference numeral 30 denotes an objective lens, the reference numeral 31 designates a band-pass filter transmitting only light of 780 nm therethrough, the reference numeral 32 denotes a stopper, the reference numeral 33 designates a topic lens, and the reference numeral 34 denotes a photodetector.

Light beams emitted from the semiconductor lasers 21 and 22 become divergent light beams and enter the collimator lenses 23 and 24, respectively, and are modified into parallel light beams by these lenses light of 780 nm further enters the diffraction grating 25, and is divided into three effective light beams (0-order diffracted light and ±1st-order diffracted lights) by this diffraction grating. The light beam of 780 nm and the light beam of 830 nm enter, as P-polarized components, dielectric multi-layer film laminated on the adhesively secured surface of the dichroic prism 26 having a spectral characteristic as shown in FIG. 4 of the accompanying drawings. The dichroic prism 26, as is apparent from FIG. 4, has the characteristic of transmitting light of 780 nm of P-polarized light therethrough and reflecting light of 830 nm. Therefore, the light beam of 780 nm is transmitted and the light beam of 830 nm is reflected, and the two light beams emerge from the dichroic prism 26 as they are combined together. The light beam passed through this dichroic prism 26 is shaped into a predetermined light intensity distribution by the beam shaping prism 27, and then enters the polarizing beam splitter 28. The polarizing beam splitter 28, as shown in FIG. 5 of the accompanying drawings, has the spectral characteristic of transmitting P-polarized light therethrough and reflecting S-polarized light, and transmits the light beams of two wavelengths therethrough because these light beams are P-polarized components. Then, these light beams of two wavelengths are converted into circularly polarized light when they are transmitted through the quarter wavelength plate 29, and converged by the objective lens 30. The light beam of 780 nm is applied onto the optical card 1 as three minute beam spots S1 (+1st-order diffracted light), S2 (0-order diffracted light) and S3 (−1st-order diffracted light), and these beam spots are used as reproducing light and signal lights for AT and AF control. Also, the light beam of 830 nm is applied onto the optical card 1 as a minute beam spot of S2 (0-order diffracted light) and used as recording light.

The positions of the light beam spots on the optical card 1 are similar to those shown in FIG. 2, and the light beam spots S1 and S3 lie on the adjacent tracking tracks 4 and the light beam spot S2 lies on the information track 2 between said tracking tracks. As regards the positional relation between the light beam spot S2 of 780 nm and the light beam spot S2 of 830 nm, it is better for the light beam spot S2 of 830 nm, which is the recording light, to lie somewhat in the direction of travel, but the positional relation is free in principle and here, these two light beam spots coincide in position with each other. Thus, the reflected lights from the light beam spots formed on the optical card 1 pass through the objective lens 30 and are thereby made substantially parallel to one another and are again transmitted through the quarter wavelength plate 29, whereby they become light beams having their direction of polarization rotated by 90° with respect to that when they have entered. Therefore, they enter the polarizing beam splitter 28 as S-polarized beams, and since this splitter reflects S-polarized light as previously described, the light beams are reflected toward the band-pass filter 31. Only the light in the vicinity of 780 nm is transmitted through, and the lights of the other wavelengths are reflected by the band-pass filter 31 having a spectral characteristic of transmitting only the light in the vicinity of 780 nm therethrough as shown in FIG. 6 of the accompanying drawings, whereby only the light of 780 nm is directed as a light for a signal to the detecting optical system. The light transmitted through the band-pass filter 31 is converged by the toric lens 33 and enters the photodetector 34. The photodetector 34 is of a construction as shown in FIG. 7 of the accompanying drawings, and effects tracking control by signals received by light receiving elements 11 and 13, and effects focus control and reproducing signal detection by a signal received by a light receiving element 12 which is a four-division element.

However, in the example of the optical head shown in FIG. 3, two semiconductor lasers are required, and this leads to the problem that the rate the optical system occupies becomes great. That is, compactness and light weight are required of the optical head, whereby the higher speed of access time is desired. However, as previously described, an increase in the number of optical parts has hampered the compactness of the optical head and has hindered the higher speed.

The present invention has been made in view of such circumstances and the object thereof is to provide an optical information recording-reproducing apparatus in which in spite of two light sources being used, the number of parts can be effectively decreased, whereby an optical head can be made compact and light in weight.

To achieve the above object, there is provided an optical information recording-reproducing apparatus which has two light sources emitting a light beam for recording and a light beam for reproduction differing in wavelength from each other and records and/or reproduces information on a recording medium by the use of the light beams from said light sources, characterized in that a beam shaping prism for shaping the light beams from said two light sources into predetermined intensity distributions is comprised of a division prism comprising at least three prisms cemented together, a polarization dividing surface transmitting therethrough the light beams from said light sources and reflecting the reflected light from said recording medium is formed on at least one of the dividing surfaces of said division prism, and a wavelength dividing surface, for directing the reproducing light beam of the reflected light from said recording medium to a detecting optical system, is formed on at least one other dividing surface.

DETAILED DESCRIPTION OF THE PREFERRED EMBODIMENTS

Figure 3:
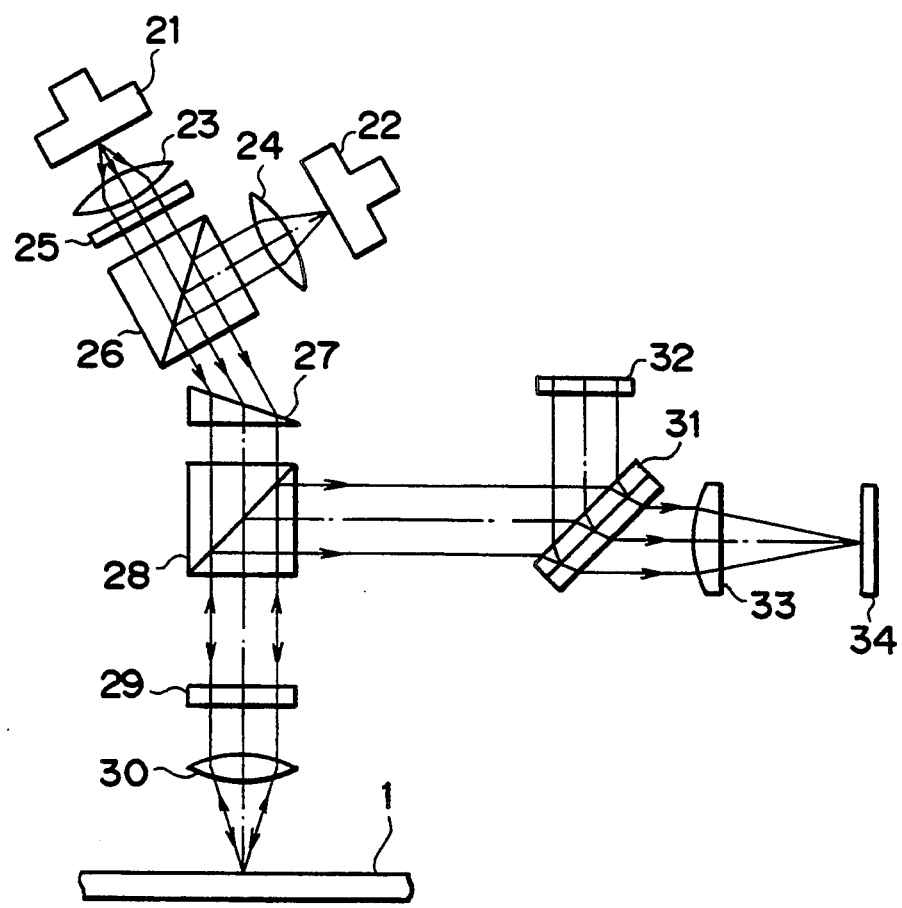
FIG. 3 shows the construction of an optical head optical system of the two-light source type.
Figure 8:
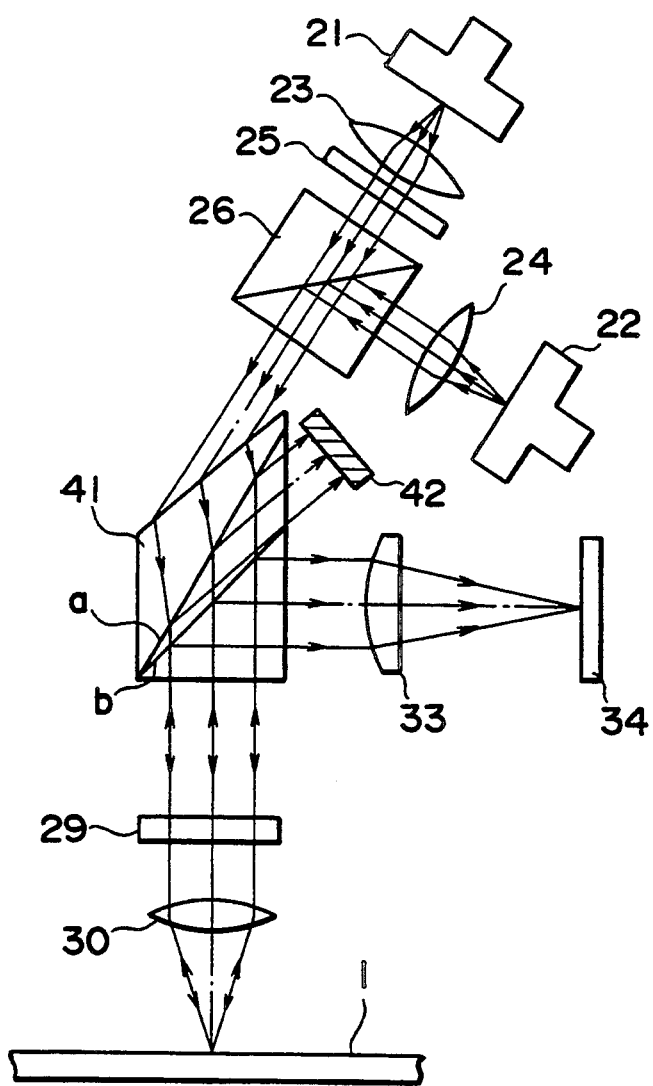
FIG. 8 shows the construction of an embodiment of the optical information recording-reproducing apparatus of the present invention.

Some embodiments of the present invention will hereinafter be described in detail with reference to the drawings. FIG. 8 shows the construction of an embodiment of the optical head optical system in the optical information recording-reproducing apparatus of the present invention. In FIG. 8, portions identical to those of the apparatus previously described and shown in FIG. 3 are given identical reference numerals.

In FIG. 8, the reference numeral 21 designates a semiconductor laser emitting a reproducing light beam, and the reference numeral 22 denotes a semiconductor laser emitting a recording light beam. The semiconductor laser 21 emits light of wavelength 780 nm as reproducing light, and the semiconductor laser 22 emits light of wavelength 830 nm as recording light. The reference numerals 23 and 24 designate collimator lenses, the reference numeral 25 denotes a diffraction grating, and the reference numeral 26 designates a dichroic prism. These are the same as those described in connection with FIG. 3.

Figure 5:
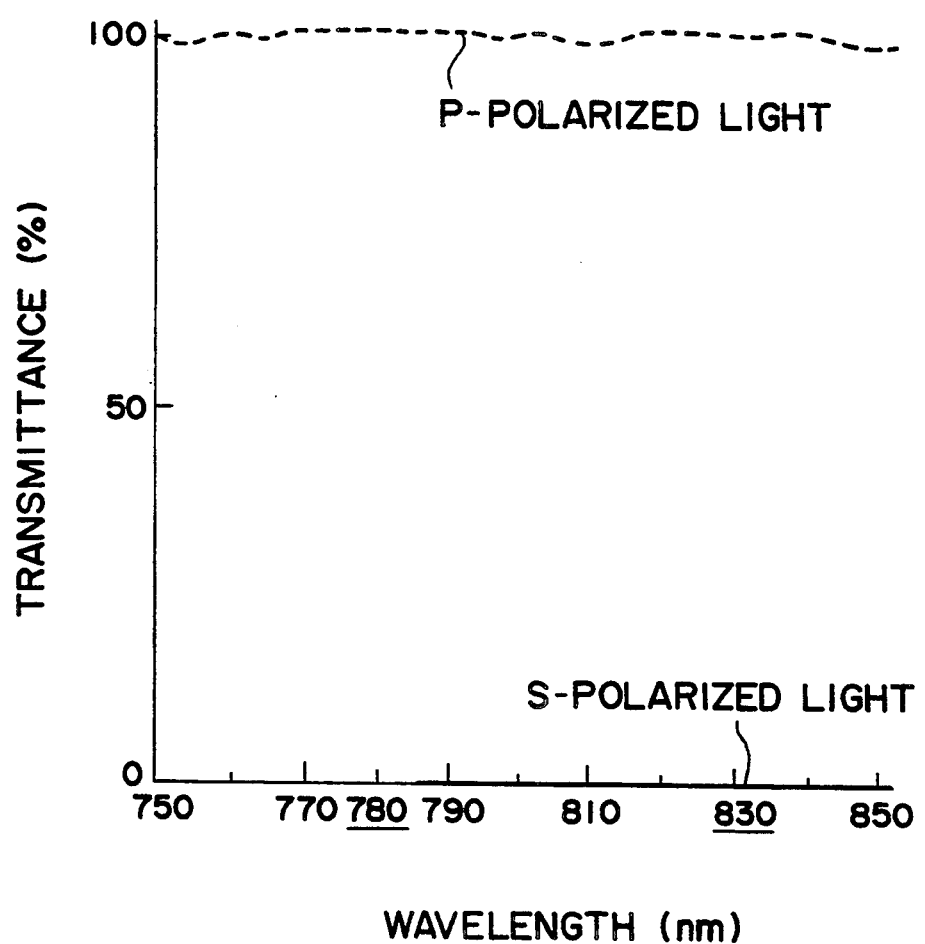
FIG. 5 is a graph showing the spectral characteristics of a polarizing beam splitter 28 and the surface a of a beam shaping prism 41.
Figure 6:
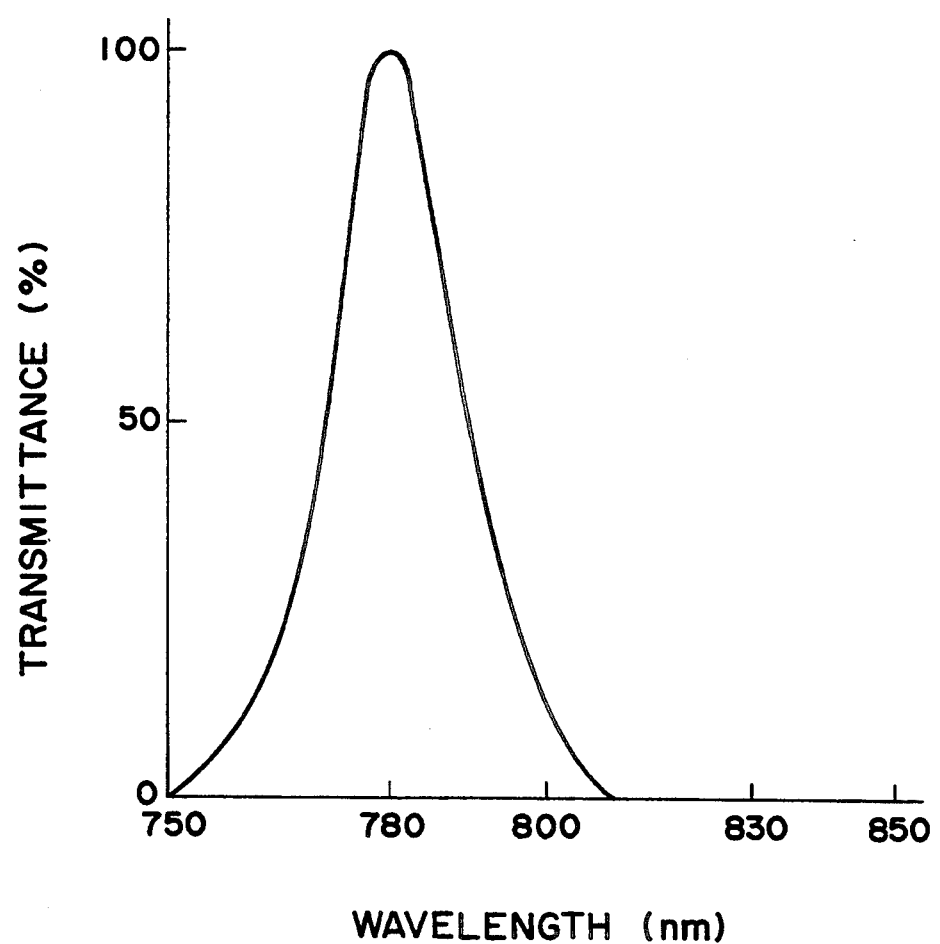
FIG. 6 is a graph showing the spectral characteristic of a band-pass filter 31.
Figure 9:
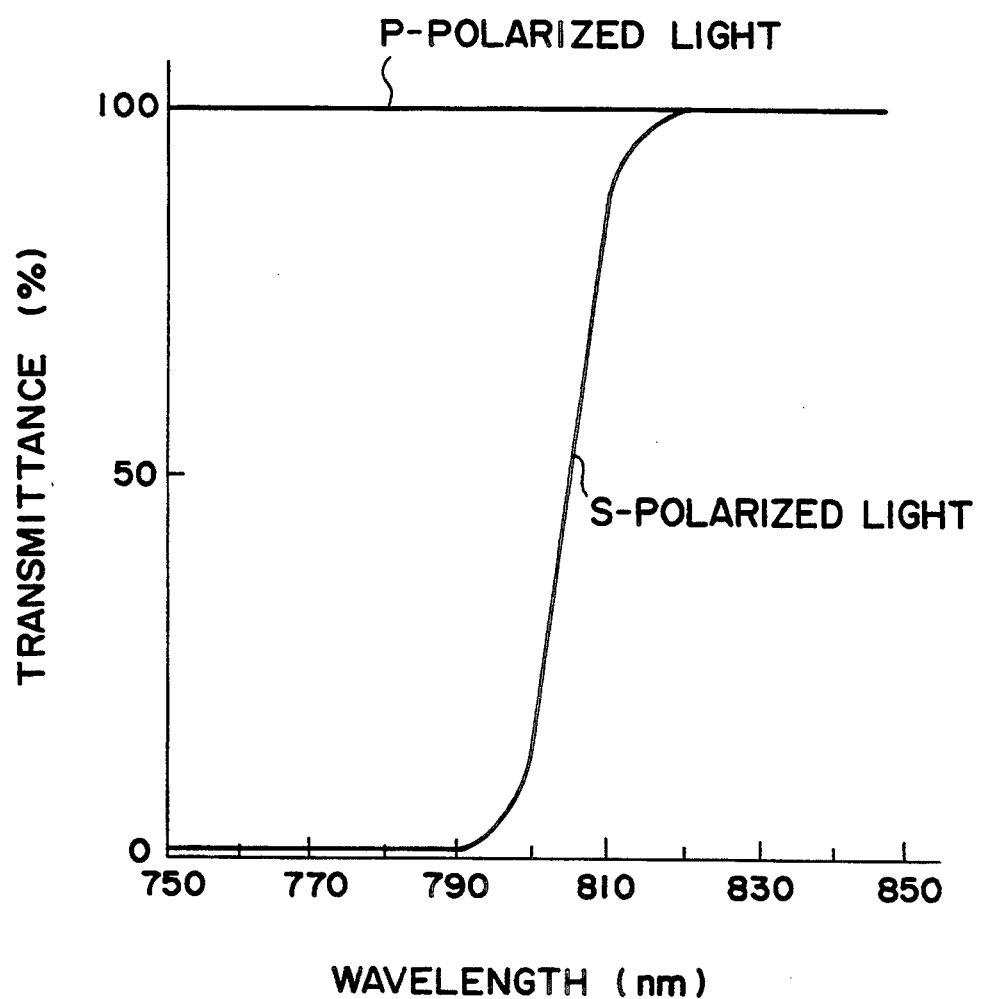
FIG. 9 is a graph showing the spectral characteristic of the surface b of a beam shaping prism.

The reference numeral 41 denotes a beam shaping prism which forms a feature of the present invention and which is endowed with the polarization dividing function and the wavelength dividing function, in addition to the beam shaping function. That is, the beam shaping prism 41 comprises three prisms cemented together, and the cemented surface a thereof on the semiconductor laser side has a spectral characteristic as shown in FIG. 5, and the cemented surface b thereof on the other side has a spectral characteristic as shown in FIG. 9. Also, the beam shaping prism 41 is formed of at least two kinds of glass materials and has an achromatic action. Accordingly, the beam shaping prism 41 is adapted to correct chromatic aberration by its achromatic action and suppress the influence of the wavelength fluctuation of the laser beam. The reference numeral 42 designates a stopper for absorbing light reflected onto the surface a. The reference numeral 29 denotes a quarter wavelength plate, the reference numeral 30 designates an objective lens, the reference numeral 33 denotes a toric lens, the reference numeral 34 designates a photodetector, and the reference numeral 1 denotes an optical card which is an optical information recording medium. These are the same as those described previously.

The operation of the present embodiment will now be described. The optical reproduction of information will first be described.

Figure 4:
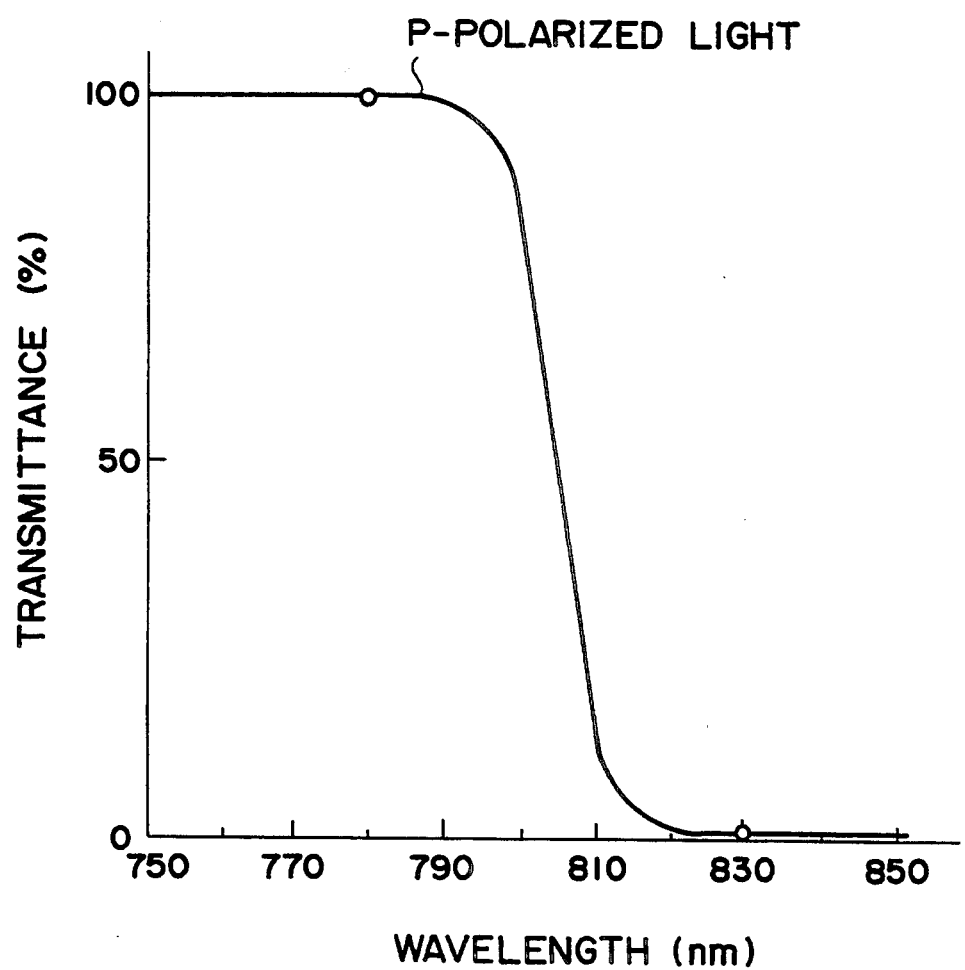
FIG. 4 is a graph showing the spectral characteristics of a dichroic prism 26.

The light beam emitted from the semiconductor laser 21 is polarized inwardly in the plane of the drawing sheet at a wavelength of 780 nm as previously described and is collimated by the collimator lens 23. Also, the light beam is divided into three light beams (0-order diffracted light beam and ±1st-order diffracted light beams) by the diffraction grating 25, and these three light beams enter the dichroic prism 26. The dichroic prism 26 is of a construction in which dielectric multi-layer film having a characteristic as shown in FIG. 4 is disposed between two prisms, and the three light beams having a wavelength of 780 nm are P-polarized components and are therefore transmitted through this multi-layer film by nearly 100%.

Figure 1:
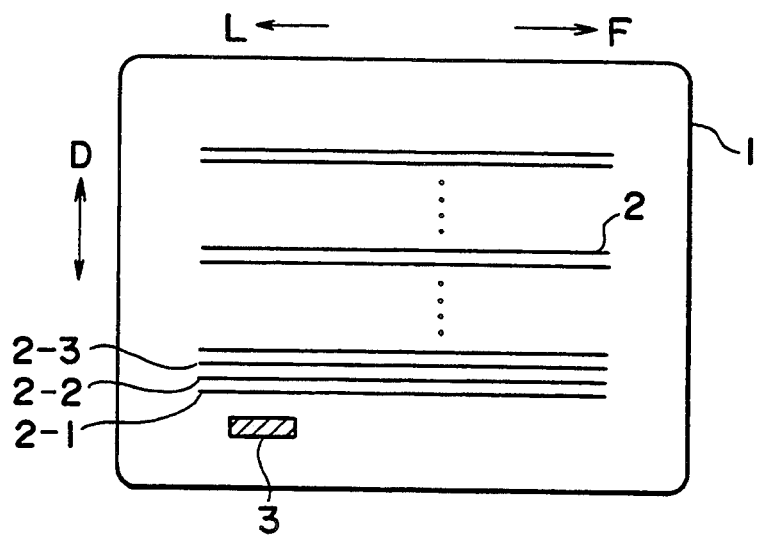
FIG. 1 is a plan view of an optical card.
Figure 2:
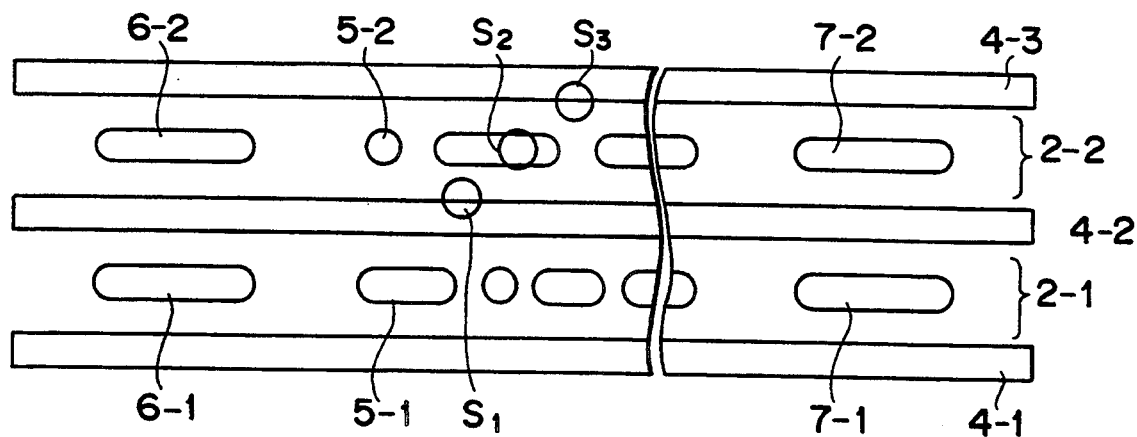
FIG. 2 is a fragmentary enlarged view of the optical card.

The light beams transmitted through the dichroic prism 26 enter the beam shaping prism 41. The beam shaping prism 41 is such that as previously described, the surface a thereof has the spectral characteristic shown in FIG. 5 and the surface b thereof has the spectral characteristic shown in FIG. 9. Accordingly, the three light beams, which are P-polarized components, are transmitted through both of the surfaces a and b by nearly 100%, and are shaped into predetermined light intensity distributions and enter the quarter wavelength plate 29. These light beams are converted into circularly polarized lights by the quarter wavelength plate 29, whereafter they are condensed by the objective lens 30 and applied onto the optical card 1. On the optical card 1, as described in connection with FIG. 2, there are formed three minute light spots S1, S2 and S3. At this time, reflected light from an information pit row by S2 is used as information reproducing light and AF signal, and reflected lights from tracking tracks by S1 and S3 are used as AT signal. Each of these reflected lights become reverse circularly polarized light by being reflected, and is again made into a parallel light beam by the objective lens 30 and is transmitted through the quarter wavelength plate 29. Also, at this time, the direction of polarization of each light beam is changed to a direction perpendicular to the plane of the drawing sheet. This light beam again enters the surface b of the beam shaping prism 41 as S-polarized light. The surface b of the beam shaping prism 41 has a spectral characteristic as shown in FIG. 9 and therefore, each light beam is reflected toward the toric lens 33 side by nearly 100% and directed to the detecting optical system. Each light beams is then converted by the toric lens 33 and enters the photodetector 34, whereby each signal is detected. AT and AF control signals are detected during the recording operation as well.

The recording operation will now be described.

The light beam emitted from the semiconductor laser 22 is polarized inwardly in the plane of the drawing sheet at a wavelength of 830 nm, as previously described, and is collimated by the collimator lens 24. The collimated light beam enters the dichroic prism 26 as a P-polarized component. The dichroic prism 26 has the spectral characteristic as shown in FIG. 4 and therefore, the light beam is reflected to the dielectric multi-layer film of the cemented surface of the dichroic prism 26 by nearly 100%, and is directed to the beam shaping prism 41. The beam shaping prism 41 is such that both of the surfaces a and b thereof transmit P-polarized component therethrough by nearly 100% and therefore, the incident light is transmitted through this prism 41 and enters the quarter wavelength plate 29. The light is then condensed by the objective lens 30 and applied onto the optical card 1. The minute light spot thus applied is only S2 which is 0-order diffracted light, and by this minute light spot S2, information is recorded on the information tracks on the optical card 1. Here, the position of the light spot S2, which is reproducing light of 780 nm and the position of the light spot S2 which is recording light of 830 nm, are coincident with each other.

On the other hand, the light beam reflected from the optical card 1, like the reproducing light, is again transmitted through the quarter wavelength plate 29, whereby the direction of polarization thereof is changed to a direction perpendicular to the plane of the drawing sheet. Accordingly, this light beam enters the surface b of the beam shaping prism 41 as S-polarized light. The surface b of the beam shaping prism 41, as shown in FIG. 9, transmits therethrough the light in the vicinity of wavelength 830 nm of the S-polarized component by nearly 100% and therefore, the incident light passes through the surface b to the surface a. This surface a, as shown in FIG. 5, has a characteristic of reflecting S-polarized component by nearly 100% and therefore, the light beam incident on the surface a is reflected toward the stopper 42 and absorbed thereby. That is, the light beam for recording, which is reflected from the optical card 1, is guided to the stopper 42 by the beam shaping prism 41 so as not to travel toward the detecting optical system, and is absorbed by the stopper 42.

As described above, in the present embodiment, the reproducing light beam reflected from the optical card 1 is directed to the detecting optical system by the surfaces a and b of the beam shaping prism 41, and the recording light beam reflected from the optical card 1 is absorbed by the stopper 42. That is, the beam shaping prism 41 is endowed with the polarization dividing characteristic and the wavelength dividing characteristic and therefore, selectively guides only the reproducing light beam to the detecting optical system and performs two functions as a polarizing beam splitter and a band-pass filter at a time. Accordingly, the beam shaping prism 41 functions as a polarizing beam splitter and a band-pass filter, in addition to its original function of shaping the recording light beam and the reproducing light beam into predetermined light intensity distributions and therefore, can eliminate these parts and thus, can make the optical head optical system remarkably compact and light in weight.

In the above-described embodiment, the beam shaping prism 41 is formed of two or more kinds of glass materials and thus has an achromatic function, but where the achromatic action is unnecessary, the prism may be made of three identical glass materials. Also, in the embodiment, the beam shaping prism 41 is divided into three and the divided surface thereof is endowed with the polarization dividing characteristic and the wavelength dividing characteristic, but alternatively, the beam shaping prism may be divided into more than three and a plurality of surfaces thereof may be endowed with the polarization dividing characteristic and the wavelength dividing characteristic.

As described above, according to the present invention, the polarizing beam splitter and band-pass filter of the optical head optical system of the two-light-source type can be eliminated, whereby the optical head optical system can be made remarkably more compact and lighter in weight than before. Accordingly, the higher speed of the apparatus can be achieved and a reduction in cost can also be achieved.

Figure 10:
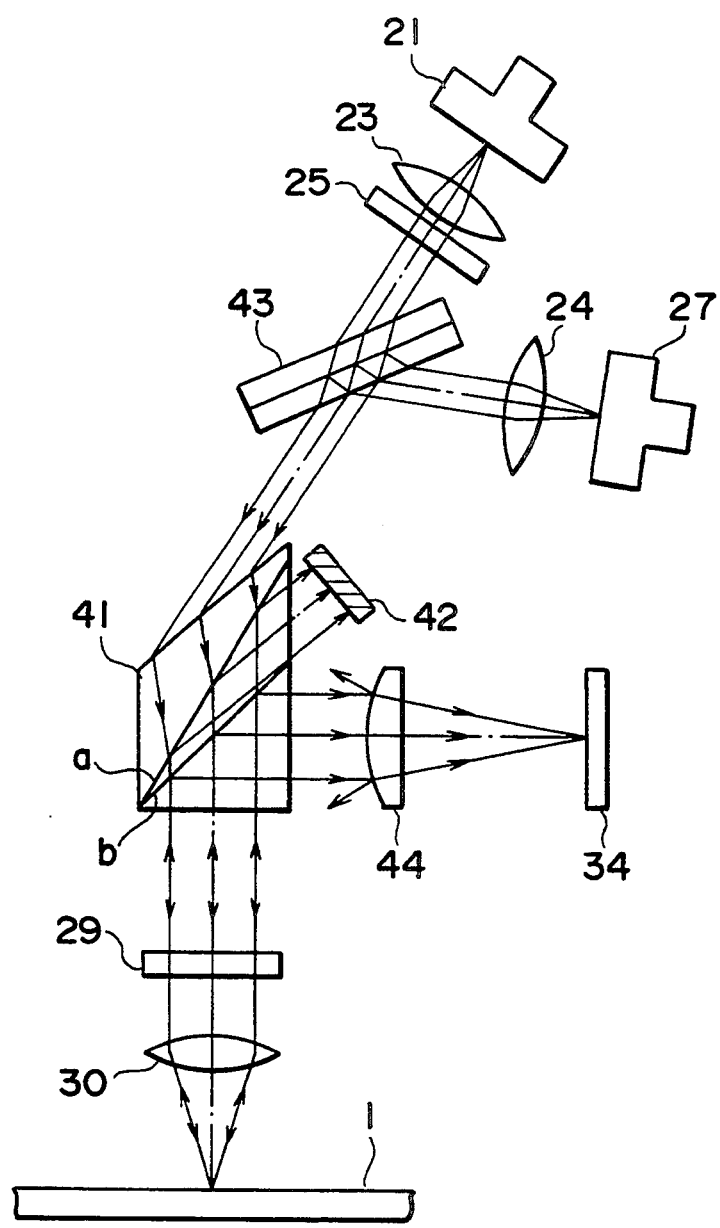
FIG. 10 shows the construction of another embodiment.

FIG. 10 shows another embodiment of the optical information recording-reproducing apparatus of the present invention. This embodiment is an optical head optical system using a dichroic mirror 43 in lieu of the dichroic prism 26, but alternatively, may use the beam shaping prism 41 as previously described to obtain a similar effect.

This dichroic mirror 43 comprises dielectric multi-layer film sandwiched between two plate-like glass materials.

Figure 11:
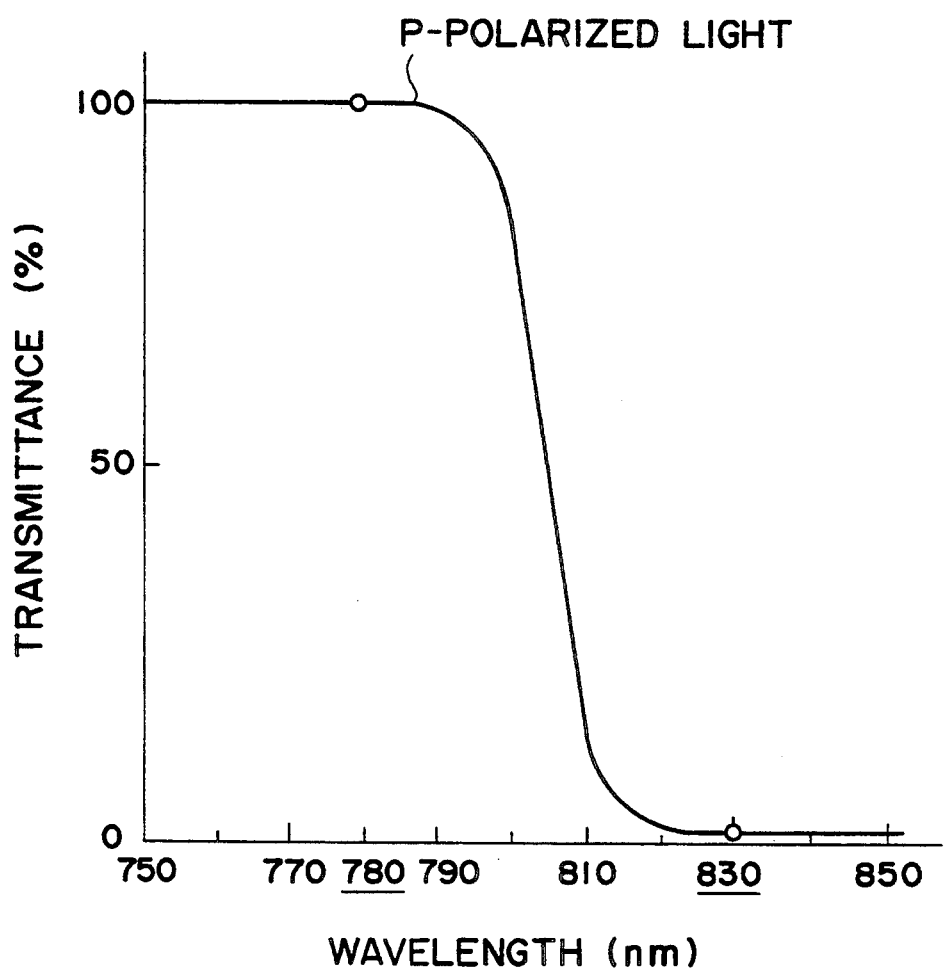
FIGS. 11 and 15 are graphs showing the spectral characteristic of a dichroic mirror.

The dichroic mirror 43 has a spectral characteristic as shown in FIG. 11. Three light beams of wavelength 780 nm as P-polarized components are transmitted by nearly 100% through the dielectric multi-layer film of this optical element, i.e., the plate-like dichroic mirror 43.

The use of such a dichroic mirror 43, as compared with the use of a dichroic prism, can make manufacture simple and reduce the cost.

Also, it is very difficult to design the film so that light of wavelength 830 nm may be transmitted fully by 100% through the surface b of the beam shaping prism 41.

Figure 12:
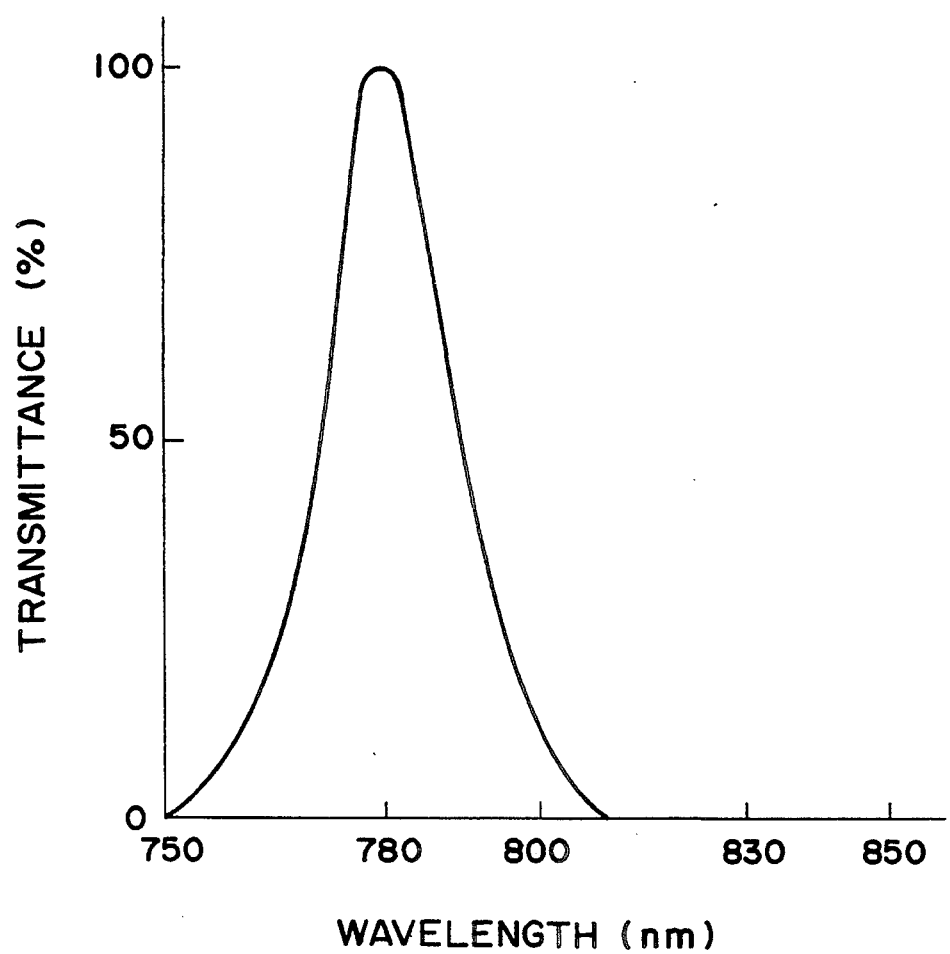
FIG. 12 is a graph showing the spectral characteristic of dielectric multi-layer film deposited by evaporation on a converging lens.

So, in the embodiment shown in FIG. 10, dielectric multi-layer film having a spectral characteristic as shown in FIG. 12 is deposited by evaporation on the surface of curvature of a toric lens 44 for converging the light beam reflected by the beam shaping prism 41, which surface is adjacent to the beam shaping prism 41. The spectral characteristic, as is apparent from FIG. 12, is a characteristic of transmitting light of wavelength 780 nm and reflecting the other lights. Accordingly, the light of wavelength 780 nm reflected by the beam shaping prism 41 is transmitted through the toric lens 44 with the aid of the spectral characteristic shown in FIG. 12. On the other hand, light of wavelength 830 nm is reflected by the toric lens 44, and the selective transmission of wavelengths similar to that by a band-pass filter is effected. Thus, only the light of wavelength 780 nm is transmitted through the toric lens 44, by which this light is converged and enters the photodetector 34.

Figure 13:
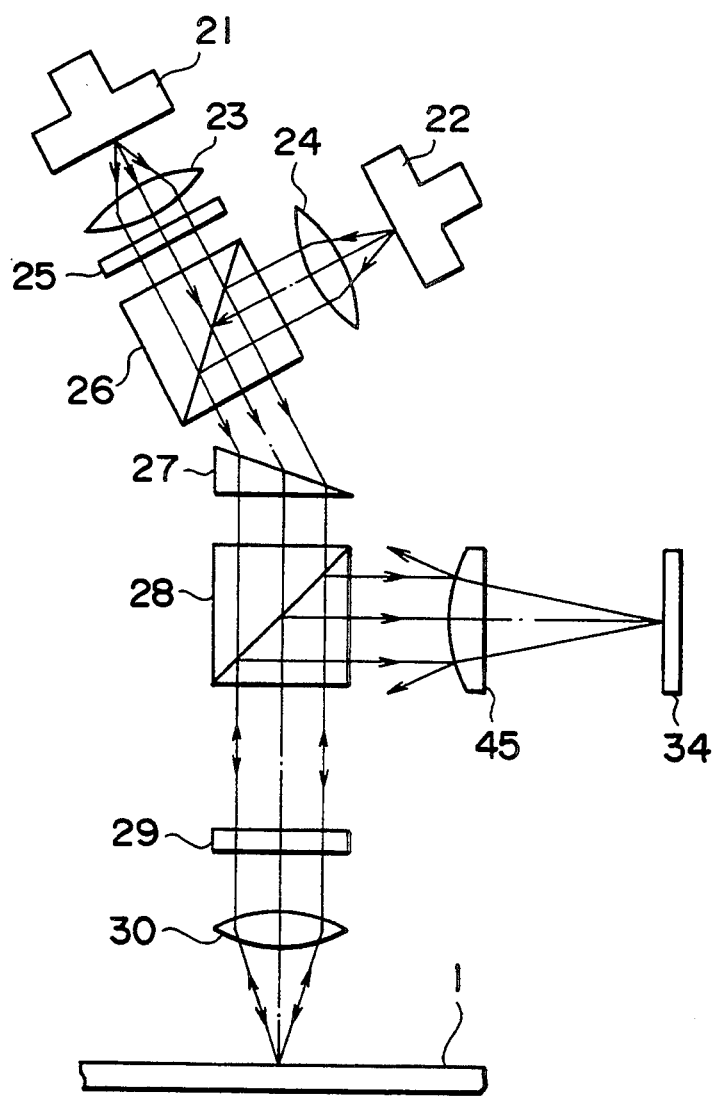
FIGS. 13 and 14 show the construction of an embodiment of the optical head optical system in the optical information recording-reproducing apparatus of the present invention.

A further embodiment of the optical information recording-reproducing apparatus of the present invention will hereinafter be described in detail with reference to the drawings. FIG. 13 shows the construction of an embodiment of the optical head optical system of the two-light-source type in the optical information recording-reproducing apparatus of the present invention. In FIG. 13, portions identical to those of the apparatus described in connection with FIG. 3 are given identical reference characters.

In FIG. 13, the reference numeral 21 designates a semiconductor laser emitting a light beam of wavelength 780 nm used as reproducing light, and the reference numeral 22 denotes a semiconductor laser emitting a light beam of wavelength 830 nm used as recording light. The light beams from these semiconductor lasers 21 and 22 enter the optical card 1 and the reflected lights therefrom again enters the polarizing beam splitter 28, but up to this stage is entirely the same as the substance described in connection with the apparatus shown in FIG. 3 and therefore need not be described.

Figure 7:
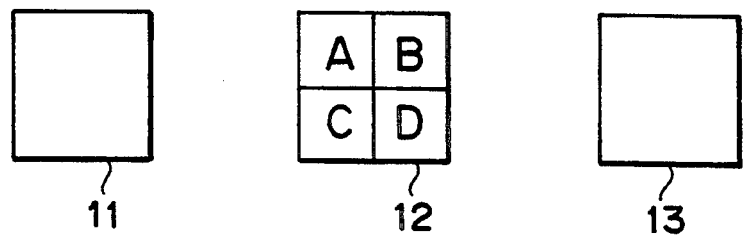
FIG. 7 illustrates the light receiving surface of a photodetector 34.

The present embodiment has its feature in a toric lens 45 for converging two light beams reflected by the polarizing beam splitter 28. That is, dielectric multi-layer film having the spectral characteristic as shown in FIG. 12 is deposited by evaporation on the surface of curvature of the toric lens 45 which is adjacent to the polarizing beam splitter 28. The spectral characteristic, as is apparent from FIG. 12, is a characteristic of transmitting light of wavelength 780 nm and reflecting the other lights. Accordingly, the light of wavelength 780 nm reflected by the polarizing beam splitter 28 is transmitted through the toric lens 45 with the aid of the spectral characteristic shown in FIG. 12. On the other hand, light of wavelength 830 nm is reflected by the toric lens 45, and the selective transmission of wavelengths similar to that by a band-pass filter is effected. Thus, only the light of wavelength 780 nm is transmitted through the toric lens 45, by which this light is converted and enters the photodetector 34. The photodetector 34, as shown in FIG. 7, is comprised of light receiving elements 11, 13 and a light receiving element 12 divided into four, and by the reception signals of these elements, the reproduction of recording information or tracking or focusing control is effected.

The light reflected from the toric lens 45 is reflected in accordance with the curvature of the toric lens 45 and therefore becomes a divergent light, which thus deviates from the optical path of the optical system except for some of said light. Also, the light remaining in the optical path of the optical system is only of a very slight quantity and is further a divergent light and therefore, gradually deviates from the optical path of the optical system and along therewith, the quantity of light attenuates. Further, this light is a divergent light and therefore, does not form a focus on the optical card 1 or on the light emitting point of the semiconductor laser 22. From what has been described above, the deflected light from the toric lens 45 does not become noise and therefore, the operation of the apparatus is hindered in no way.

The above embodiment has been shown with respect to an example in which dielectric multi-layer film is deposited by evaporation on the surface of curvature of the toric lens 45, but it will be more effective if the dielectric multi-layer film is deposited by evaporation on the both surfaces of the toric lens. A similar effect will also be obtained if dielectric multi-layer film is deposited by evaporation on the opposite surface of the toric lens 45. In this case, the surface of the toric lens 45 can be disposed not perpendicularly, but obliquely to the optic axis.

According to the embodiment described just above and shown in FIG. 13, dielectric multi-layer film reflecting the recording light and transmitting only the reproducing light therethrough is formed on the converging lens and therefore, the band-pass filter which has heretofore been necessary can be eliminated. Accordingly, the optical head can be made compact and light in weight by a reduction in the number of parts, whereby a higher speed can be achieved.

Figure 14:
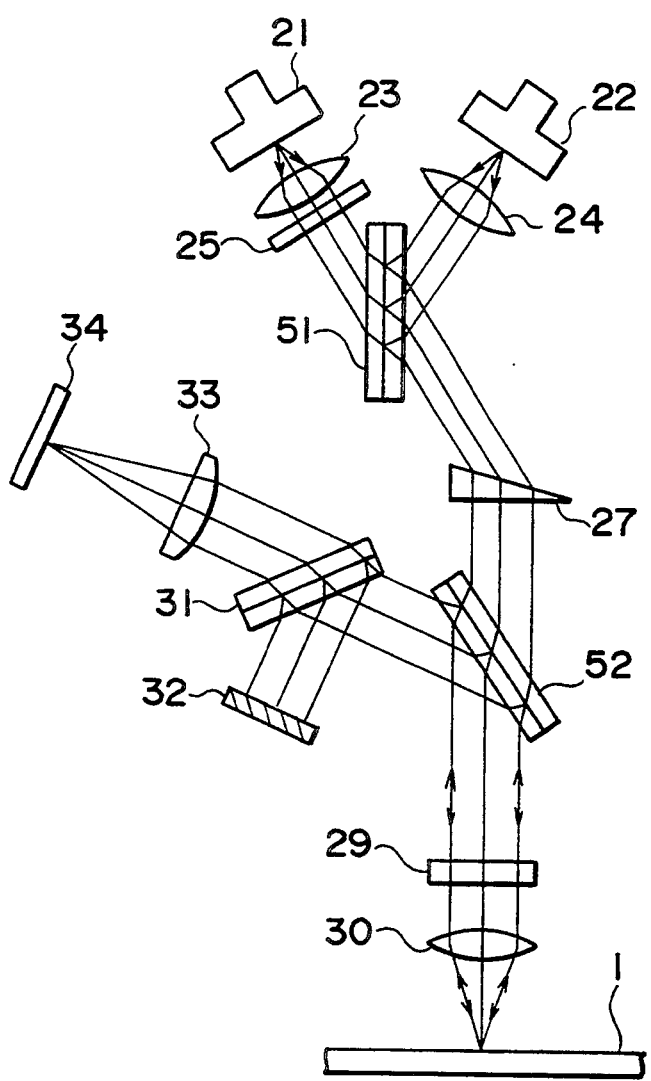

Still a further embodiment of the present invention will hereinafter be specifically described with reference to the drawings. The optical system in an embodiment shown in FIG. 14 is similar to that previously described in connection with FIG. 3, except for the prism, and therefore need not be described, and only the essential portions of this embodiment will hereinafter be described. In FIG. 14, the reference numeral 51 designates an optical element replacing the dichroic prism, and this optical element comprises dielectric multi-layer film sandwiched between two plate-like glass materials. Likewise, a similar optical element 52 is prepared as an optical element replacing the polarizing beam splitter.

The optical element 51 has the spectral characteristic as shown in FIG. 12. Three light beams of wavelength 780 nm as P-polarized components are transmitted through the dielectric multi-layer film of this optical element, i.e., the plate-like 5 dichroic mirror 51 by nearly 100%. Also, the optical element 52 has the spectral characteristic as shown in FIG. 5. The three light beams of wavelength 780 nm are P-polarized lights to the dielectric multi-layer film of this optical element, i.e., the plate-like polarizing beam splitter 52, and are transmitted through this dielectric multi-layer film by nearly 100%. What has been described just above shows the functions of the optical elements 51 and 52 to the light beams from the light sources to the recording medium, but as regards the reflected light, it enters the multi-layer film of the polarizing beam splitter 52 as S-polarized light and therefore, is reflected by nearly 100% as shown by the spectral characteristic of FIG. 5, and directed to the photodetector 34.

In this manner, by an optical system including the optical elements 51 and 52 in the present embodiment, control for the reproduction of information is effected as in the case of the example described in connection with FIG. 3. Auto tracking and auto focusing control signals are continued not only during reproduction, but also during recording which will hereinafter be described.

That is, the light beam emitted from the semiconductor laser 22 has a wavelength of 830 nm and is polarized inwardly in the plane of the drawing sheet, and is collimated by the collimator lens 24 and enters the dichroic mirror 51. This light beam, like the aforedescribed light beam of wavelength 780 nm, is P-polarized component to the multi-layer film of the dichroic mirror 51, and has the spectral characteristic as shown in FIG. 12 and is reflected by nearly 100%. Of course, the light beam spot for recording is only S2 (0-order diffracted light). The light beam reflected from the recording medium 1, like the light beam of wavelength 780 nm, is directed toward the photodetector, but is reflected by the band-pass filter 31 and absorbed by the stopper 32.

The use of the optical elements 51 and 52, as compared with the use of the prism heretofore employed, can make manufacture simple and reduce the cost. That is, in the present embodiment, two glass materials, for example, two glass plates are cemented together, whereby the dichroic mirror or the polarizing beam splitter as described above can be constructed. Incidentally, in the conventional prism structure, the number of polished surfaces transmitting light therethrough is great and the error or the like of prism angle must be sufficiently taken into account and accuracy becomes low.

Also, in the present embodiment, it is unnecessary to dispose the optical path at a right angle as in the case of the conventional 45° prism, and the width of the optical system can be made small. In the case of the present embodiment, the optical path forms an angle of 66°. Like this, the angle of the optical path can be made smaller than 90°. The angles of incidence and emergence relative to the optical elements 51 and 52 are not perpendicular and therefore, the reflected light (returning light) from each surface does not enter LD and the sensor and thus, noise can be eliminated.

Figure 15:
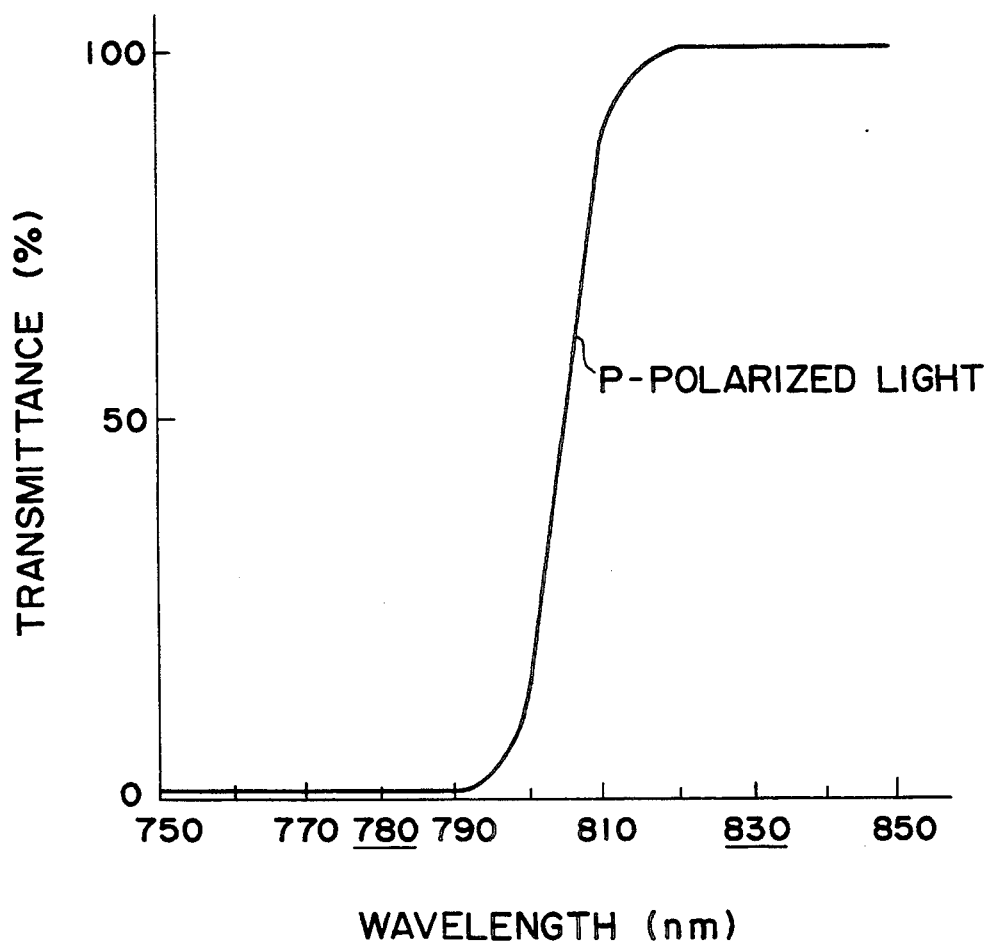

The spectral characteristic of the dichroic mirror 51 may be designed as shown in FIG. 15 and the dichroic mirror 51 may be used in such a manner as to reflect the light of wavelength 780 nm and transmit the light of wavelength 830 nm.

Also, the light of wavelength 780 nm may be used for recording and the light of wavelength 830 nm may be used for reproduction.

In the present invention, as described above in detail, an optical element comprising dielectric multi-layer film sandwiched between two plate-like glass materials is used as means for making the optical axes of two light beams coincident with each other. One of the light beams is transmitted through the dielectric multi-layer film and the other light beam is reflected by the dielectric multi-layer film. Therefore, unlike the case of the conventional dichroic prism or polarizing beam splitter, the manufacture of the element of the optical system is made easy and the cost thereof can be reduced, and the optical system can be made compact. Moreover, no noise is created by the reflected light, and this is advantageous in light detection.

What is claimed is:

1. An optical information recording reproducing apparatus comprising:
   a light source producing a recording light beam;
   a light source producing a reproducing light beam differing in wavelength from said recording light beam;
   a detecting optical system for detecting a light reflected by a recording medium; and
   a beam shaping prism for shaping the light beams of said two light sources into predetermined intensity distributions, said beam shaping prism being constructed of a division prism comprising at least three prisms cemented together, a polarization dividing surface for transmitting the light beams from said light sources therethrough and reflecting the reflected light from said recording medium, said polarization dividing surface being formed on at least one of a plurality of dividing surfaces of said division prism, and a wavelength dividing surface for directing the reproducing light beam of the reflected light from said recording medium to a detection optical system being formed on at least one other dividing surface.

2. An optical information recording-reproducing apparatus according to claim 1, wherein said beam shaping prism is formed of at least two kinds of glass materials, thereby having an achromatic action.

3. An optical information recording-reproducing apparatus according to claim 1, wherein the polarization dividing surface of said beam shaping prism is formed adjacent to said two light sources, and the wavelength dividing surface of said beam shaping prism is formed adjacent to said recording medium.

4. An optical information recording-reproducing apparatus according to claim 1, said detecting optical system further comprising:
   a lens for converging the reflected light from said recording medium separated by said beam shaping prism and causing said reflected light to enter a photodetector, said lens having formed on the surface thereof dielectric multi-layer film for reflecting the recording light beam and transmitting the reproducing light beam therethrough.

5. An optical information recording-reproducing apparatus according to claim 4, wherein said dielectric multi-layer film is formed on the surface of curvature of said converging lens.

6. An optical information recording-reproducing apparatus according to claim 4, wherein said dielectric multi-layer film is formed on each of the surface of curvature and the planar surface of said converging lens.

7. An optical information recording-reproducing apparatus according to claim 4, wherein said dielectric multi-layer film is formed on the planar surface of said converging lens, and said converging lens is disposed obliquely so as not to be orthogonal to the optical axis.

8. An apparatus according to claim 1, further comprising optical means for directing the recording light beam and the reproducing light beam to said beam shaping prism.

9. An apparatus according to claim 8, wherein said optical means comprises a dichroic prism.

10. An apparatus according to claim 8, wherein said optical means comprises a dichroic mirror.

11. An optical information recording-reproducing apparatus comprising:
    a light source for producing a recording light beam;
    a light source for producing a reproducing light beam differing in wavelength from the recording light beam;
    a detection optical system for detecting a light beam reflected from a recording medium; and
    a prism optical system disposed between said two light sources and the recording medium and comprising a plurality of prisms, wherein said prism optical system has a light beam separation surface, which is formed on at least one surface of the plurality of prisms and which separates the light beams that are from said two light sources from the light beam that is reflected from the recording medium, and a wavelength separation surface, which is formed on at least one other surface of the plurality of prisms and which guides the reproducing light beam of the reflecting light beam from the recording medium to said detection optical system, wherein said prism optical system comprises at least two kinds of glass materials.

12. An optical information recording-reproducing apparatus comprising:
    a light source for producing a recording light beam;
    a light source for producing a reproducing light beam differing in wavelength from the recording light beam;
    a detection optical system for detecting a light beam reflected from a recording medium; and
    a prism optical system disposed between said two light sources and the recording medium and comprising a plurality of prisms, wherein said prism optical system has a light beam separation surface, which is formed on at least one surface of the plurality of prisms and which separates the light beams that are from said two light sources from the light beam that is reflected from the recording medium, and a wavelength separation surface, which is formed on at least one other surface of the plurality of prisms and which guides the reproducing light beam of the reflecting light beam from the recording medium to said detection optical system, wherein in said prism optical system the light beam separation surface is formed on the side facing said two light sources and the wavelength separation surface is formed on the side facing the recording medium.

13. An optical information recording-reproducing apparatus comprising:
   a light source for producing a recording light beam;
   a light source for producing a reproducing light beam differing in wavelength from the recording light beam;
   a detection optical system for detecting a light beam reflected from a recording medium, wherein said detection optical system comprises a lens in which dielectric multi-layer film, which reflects the recording light beam and which transmits the reproducing light beam, is formed on the surface thereof; and
   a prism optical system disposed between said two light sources and the recording medium and comprising a plurality of prisms, wherein said prism optical system has a light beam separation surface, which is formed on at least one surface of the plurality of prisms and which separates the light beams that are from said two light sources from the light beam that is reflected from the recording medium, and a wavelength separation surface, which is formed on at least one other surface of the plurality of prisms and which guides the reproducing light beam of the reflected light beam from the recording medium to said detection optical system.

14. An apparatus according to claim 13, wherein said dielectric multi-layered film is formed on the side of a surface of curvature of said lens.

15. An apparatus according to claim 13, wherein said dielectric multi-layered film is formed on a curvature surface side and a plain surface side of said lens.

16. An apparatus according to claim 13, wherein said dielectric multi-layered film is formed on the side of a plain surface of said lens, and said lens is obliquely disposed so as not to be orthogonal to the optical axis.

17. An apparatus according to claim 1, wherein said polarization dividing surface transmits therethrough substantially 100% of P-polarized light components and transmits therethrough substantially less than 100% of S-polarized light components, and wherein said wavelength dividing surface transmits therethrough substantially 100% of P-polarized light components, transmits therethrough substantially 100% of S-polarized light components with a wavelength falling in the range of wavelengths for the recording light beam and transmits therethrough substantially less than 100% of S-polarized light components with a wavelength falling in the range of wavelengths for the reproducing light beam.

18. An apparatus according to claim 11, wherein said polarization dividing surface transmits therethrough substantially 100% of P-polarized light components and transmits therethrough substantially less than 100% of S-polarized light components, and wherein said wavelength dividing surface transmits therethrough substantially 100% of P-polarized light components, transmits therethrough substantially 100% of S-polarized light components with a wavelength falling in the range of wavelengths for the recording light beam by and transmits therethrough substantially less than 100% of S-polarized light components with a wavelength falling in the range of wavelengths for the reproducing light beam.

19. An apparatus according to claim 12, wherein said polarization dividing surface transmits therethrough substantially 100% of P-polarized light components and transmits therethrough substantially less than 100% of S-polarized light components, and wherein said wavelength dividing surface transmits therethrough substantially 100% of P-polarized light components, transmits therethrough substantially 100% of S-polarized light components with a wavelength falling in the range of wavelengths for the recording light beam and transmits therethrough substantially less than 100% of S-polarized light components with a wavelength falling in the range of wavelengths for the reproducing light beam.

20. An apparatus according to claim 13, wherein said polarization dividing surface transmits therethrough substantially 100% of P-polarized light components and transmits therethrough substantially less than 100% of S-polarized light components, and wherein said wavelength dividing surface transmits therethrough substantially 100% of P-polarized light components, transmits therethrough substantially 100% of S-polarized light components with a wavelength falling in the range of wavelengths for the recording light beam and transmits therethrough substantially less than 100% of S-polarized light components with a wavelength falling in the range of wavelengths for the reproducing light beam.

* * * * *

UNITED STATES PATENT AND TRADEMARK OFFICE
CERTIFICATE OF CORRECTION

PATENT NO. : 5,379,286
DATED : January 3, 1995
INVENTOR(S) : MORITOSHI MIYAMOTO

It is certified that error appears in the above-indentified patent and that said Letters Patent is hereby corrected as shown below:

On title page,

<u>Related U.S. Application Data:</u>

[63]

"Ser. No. 729443 " should read --Ser. No. 729,443,--.

<u>FOREIGN PATENT DOCUMENTS:</u>

"61-267937  5/1985  Japan
 61-292235  6/1985  Japan
 62-208002  3/1986  Japan" should read --61-267937  11/1986  Japan
  61-292235  12/1986  Japan
  62-208002   9/1987  Japan--.

<u>OTHER PUBLICATIONS:</u>

"62-273633, May 21, 1986" should read --62-273633, Nov. 27, 1987--.

<u>ABSTRACT:</u>

[57]

Line 3, "beam. The apparatus further comprises," should read --beam, and--.

UNITED STATES PATENT AND TRADEMARK OFFICE
CERTIFICATE OF CORRECTION

PATENT NO. : 5,379,286      Page 2 of 3
DATED      : January 3, 1995
INVENTOR(S): MORITOSHI MIYAMOTO It is certified that error appears in the above-indentified patent and that said Letters Patent is hereby corrected as shown below:

ABSTRACT:

Line 5, "beam, a" should read --beam. The apparatus further comprises a--.

COLUMN 1:

Line 37, "thee" should read --the--.

COLUMN 8:

Line 67, "enters" should read --enter--.

UNITED STATES PATENT AND TRADEMARK OFFICE
CERTIFICATE OF CORRECTION

PATENT NO. : 5,379,286
DATED : January 3, 1995
INVENTOR(S) : Moritoshi Miyamoto

It is certified that error appears in the above-indentified patent and that said Letters Patent is hereby corrected as shown below:

Column 14, line 16, "by" should be deleted.

Signed and Sealed this

Eighteenth Day of July, 1995

*Attest:*

BRUCE LEHMAN

*Attesting Officer*     Commissioner of Patents and Trademarks